United States Patent [19]
Meisman et al.

[11] Patent Number: 5,724,920
[45] Date of Patent: Mar. 10, 1998

[54] ANIMAL SEAT BELT RESTRAINT

[76] Inventors: Stephen A. Meisman, 1087 Island Ave., Tarpon Springs, Fla. 34689; Karen A. Meisman; Michael P. Meisman, both of 4911 48th Ave. North, St. Petersburg, Fla. 33709; Richard L. Meisman, 3229 Bluff Blvd., Holiday, Fla. 34691

[21] Appl. No.: 769,135

[22] Filed: Dec. 18, 1996

[51] Int. Cl.⁶ .................................................. A01K 27/00
[52] U.S. Cl. ............................................ 119/771; 297/468
[58] Field of Search ............................... 119/770, 771, 119/774, 784; 297/485, 469, 468, 473

[56] References Cited

U.S. PATENT DOCUMENTS

| | | | |
|---|---|---|---|
| 2,909,154 | 10/1959 | Thomas | 119/771 |
| 3,310,034 | 3/1967 | Dishart | 119/771 |
| 4,817,562 | 4/1989 | Giroux | 119/771 |
| 4,907,541 | 3/1990 | Thompson | 119/771 |
| 4,941,434 | 7/1990 | Ellwanger | 119/771 |
| 5,154,660 | 10/1992 | Snyder et al. | 119/771 |
| 5,167,203 | 12/1992 | Scott et al. | 119/771 |
| 5,378,046 | 1/1995 | Gordy et al. | 297/485 |
| 5,598,812 | 2/1997 | Graham et al. | 119/770 |

FOREIGN PATENT DOCUMENTS

| | | | |
|---|---|---|---|
| 65509 A | 11/1982 | European Pat. Off. | 119/771 |
| 880054 | 1/1988 | WIPO . | |

*Primary Examiner*—Gene Mancene
*Assistant Examiner*—Yvonne R. Abbott
*Attorney, Agent, or Firm*—Dowell & Dowell

[57] ABSTRACT

A universal animal restraint device for use in selectively connecting a conventional leash or lead intermediate the insert tab and buckle receiver of a conventional seat belt system.

20 Claims, 3 Drawing Sheets

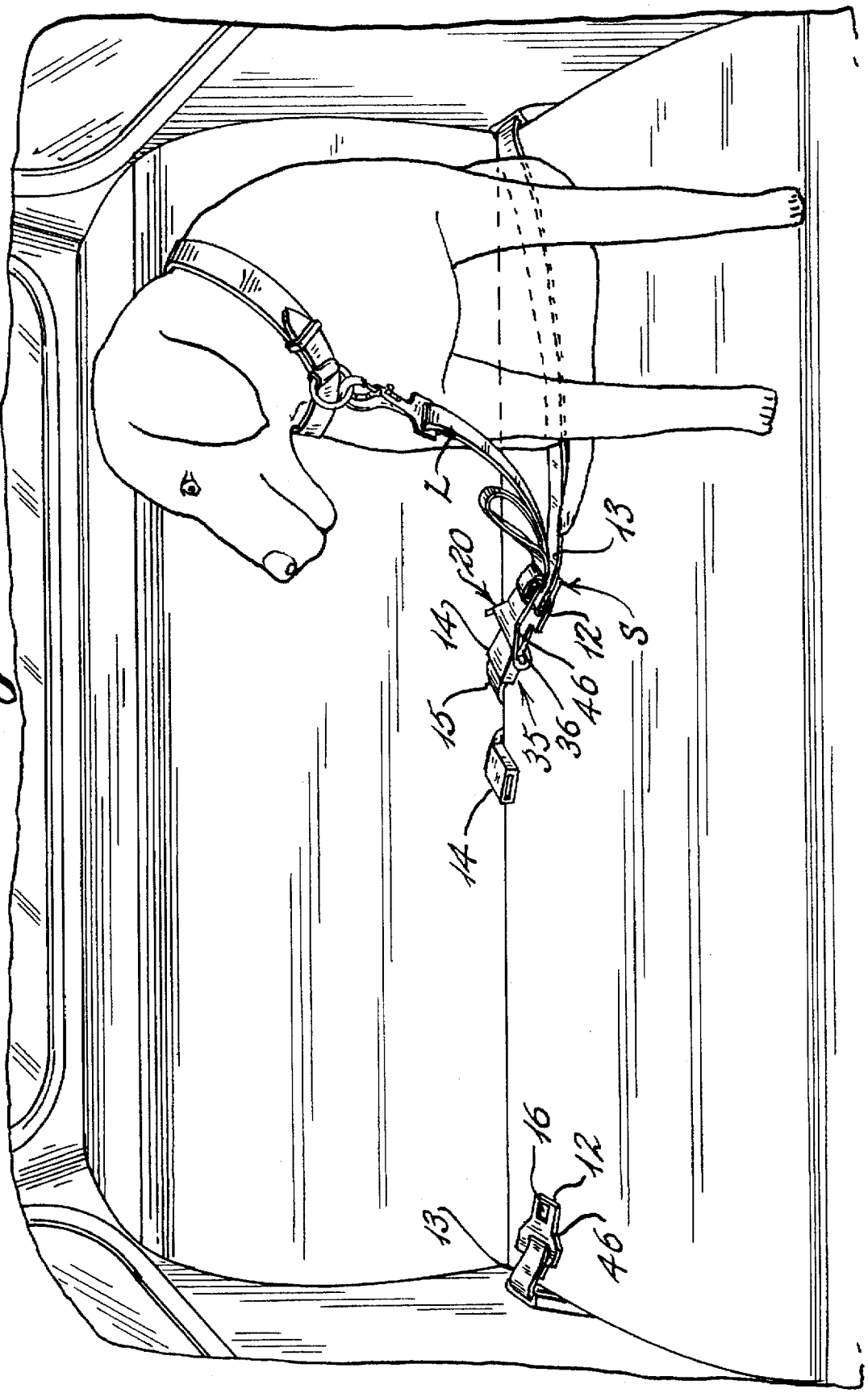

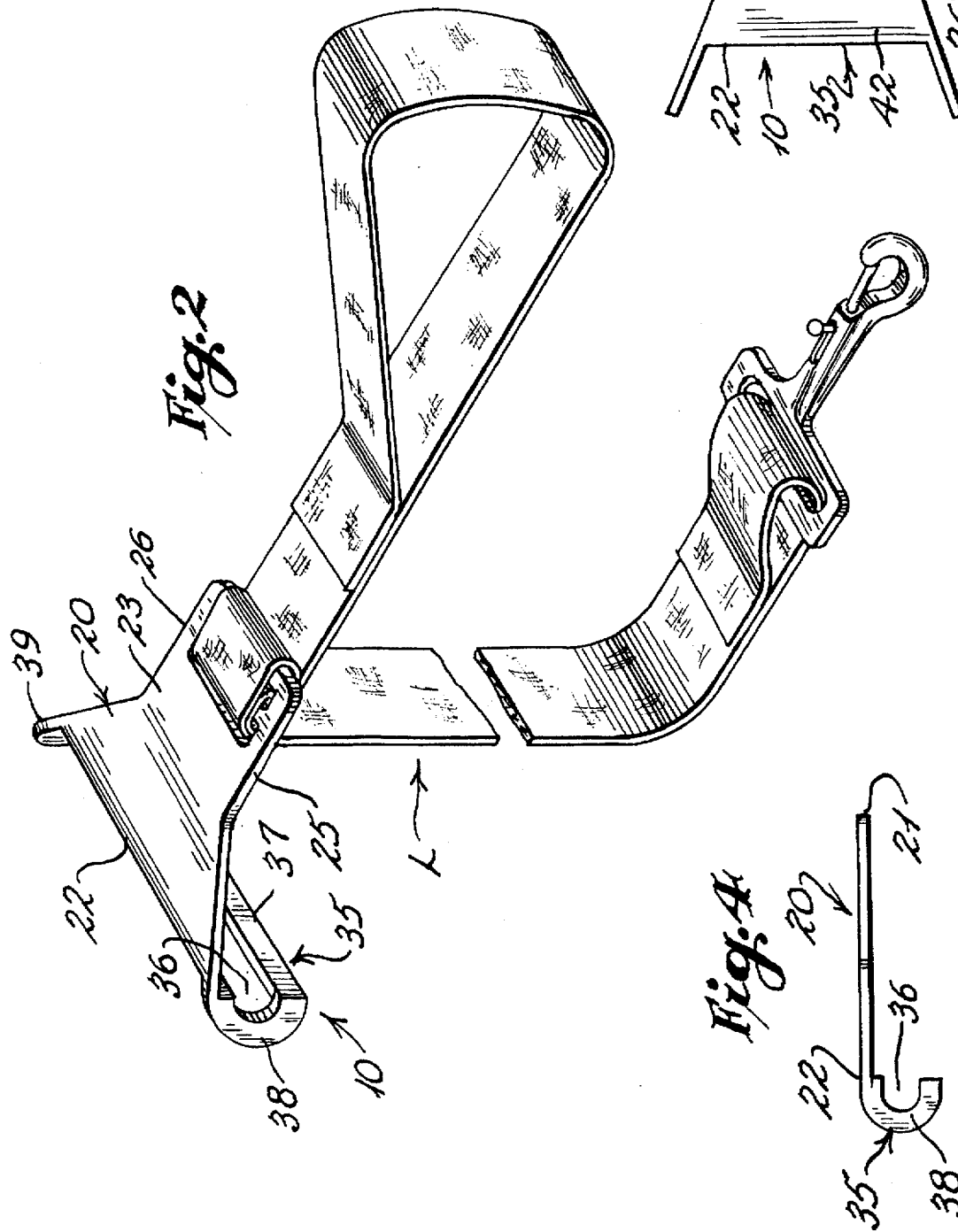

ANIMAL SEAT BELT RESTRAINT

BACKGROUND OF THE INVENTION

1. Field of the Invention

This invention is generally directed to restraint devices for use in securing domesticated animals to conventional seat belt systems utilized in automotive and other vehicles and, more particularly, to a restraint device which may be selectively or permanently mounted to a leash or animal lead in such a manner that the device may be interlocked between the conventional insert tab and a buckle receiver of a conventional seat belt system to thereby restrain an animal utilizing the conventional leash or lead.

2. History of the Related Art

For safety reasons, state and federal laws require the use of seat belt restraint systems in automotive and other vehicles. It is now being recognized that such restraint systems should also be utilized for purposes of restraining pets, such as dogs and cats, which are routinely transported in cars, trucks and other vehicles. Not only is the restraint of an animal within a vehicle necessary to protect the welfare of the animal, it is imperative to protect the safety of individuals riding in the vehicle. Often, pets can interfere with the normal operation of a vehicle, causing accidents which can result in injury or death.

In view of the foregoing, some states are beginning to require that animals be properly restrained when traveling in cars, trucks, and other types of vehicles.

In U.S. Pat. No. 4,817,562 to Giroux, a vehicular pet restraint system is disclosed which includes a belted harness which may be secured about the body of the animal and which has extension belts for attaching to a seat belt system wherein one of the belts secured to the harness includes a tab for inserting into a buckle receiver associated with the automotive seat belt restraint system and another belt includes a buckle designed to receive the insert tab of the seat belt restraint system of the vehicle. Such a device does not allow the conventional leash to be utilized and therefore requires a separate harness to be purchased by the pet owner. In addition, the restraint device must be manufactured utilizing a plurality of different types of insert tabs and buckles for cooperatively mating with the various seat belt restraint systems which are in conventional use, many of which differ in size and operating characteristics from one manufacturer to another. Therefore, the pet restraint system disclosed in the patent cannot be universally applied.

In WO Publication No. 88-0054 published Jan. 28, 1988, a seat belt restraint system is disclosed which may be incorporated with a conventional leash. The system discloses an interconnecting body having a slotted opening therein through which a conventional seat belt having a tab insert end may be inserted. The body is attached by a suitable connecting mechanism to a connector secured to a conventional leash. Unfortunately, with this type of restraint device, the interconnecting body is free to slide along the seat belt when in use and thus, the animal is not truly restrained from movement.

In U.S. Pat. No. 4,907,541 to Thompson, a pet restraint device is disclosed which includes a specialized strap connected to a harness. The strap includes one end which is bolted to the frame of the vehicle after passing through the seat between a seat back and cushion and includes at the other end a buckle receiver for receiving a tab associated with the harness. This system requires a separate attachment and does not make use of the conventional seat belt restraint systems conventionally utilized in automotive vehicles. Further, the system requires a separate harness and does not make use of conventional leashes or leads.

In U.S. Pat. No. 5,154,660 to Snyder et al., a pet restraint apparatus is disclosed which includes a harness mounted about the body of an animal which includes a female receiver of the quick-disconnect type. A separate lead is attachable utilizing a male quick-connect insert at one end which is connected to the female receiver on the harness and includes a tab at the other end for inserting into the seat belt buckle receiver of the restraint system. As with the other pet restraint devices, different sizes of insert tabs must be provided with the separate lead which secures the harness to the conventional buckle receiver as receivers in seat belt restraint systems vary in size and operating characteristics. Again, this type of device does not allow a conventional leash or lead to be utilized to secure a pet to a vehicular restraint system.

In U.S. Pat. No. 4,941,434 to Ellwanger, a quick-connect retaining leash keeper is disclosed which includes an insert tab for inserting into the conventional buckle receiver of a vehicle restraint system. The device includes a plurality of slots through which a leash may be wound in order to secure a conventional leash thereto. Unfortunately, with this type of system, the leash may be disconnected through the open slots if force is applied laterally between the leash and the keeper. In addition, the device is not universal in nature in that separate sizes of insert tabs would have to be provided with each keeper to accommodate the various sizes of conventional seat belt buckle receivers utilized in seat belt restraint systems.

In view of the foregoing, there remains a need to provide pet restraint devices which can be economically manufactured and easily used to allow conventional pet leashes, leads or harnesses to be secured universally to a plurality of different types of seat belt restraint systems.

SUMMARY OF THE INVENTION

The present invention is directed to a universal restraint device in the form of a keeper having opposite end portions. The keeper includes at least one slot adjacent one end thereof through which a conventional leash or animal lead may be inserted or secured and an enclosed slotted opening spaced therefrom of a size through which most conventional insert tabs associated with seat belt restraint systems may be extended before such tabs are connected and locked within the buckle receivers of such restraint systems. In the preferred embodiment, the keeper is formed in a generally L-shaped configuration and the slotted opening extends through a flange which is oriented generally perpendicularly with respect to the main body of the keeper. The flange preferably extends outwardly and has flared outer portions which extend away from the main body with the slot extending through the flared outer portions. The slot is configured so as to be narrow enough to prohibit the keeper from sliding relative to the seat belt once it is locked between the insert tab and the buckle receiver of a conventional seat belt restraint system.

In one embodiment, at least two generally parallel openings are provided through which a leash or lead may be wound or threaded to secure the leash with respect thereto. In another embodiment, one of the openings is generally arcuate in shape having a tongue portion extending therebetween about which a portion of a leash, lead or rope may be secured or engaged. In the preferred embodiments, the openings through which a leash or lead is attached are enclosed openings so that the leash or lead cannot be accidentally removed from the keeper when in use.

It is the primary object of the present invention to provide a low cost and universal keeper for securing conventional leashes and animal leads to substantially any seat belt restraint system in such a manner that the leash or lead cannot be moved relative to the seat belt once it is locked into position to secure the keeper relative thereto.

It is also an object of the present invention to provide a keeper for use with conventional leashes and animal leads which allows the leashes or leads to be used to quickly secure animals in a restrained manner to substantially any seat belt restraint system associated with automotive and other vehicles.

It is a further object of the present invention to enable a pet on a leash or lead to be held by or seated next to a passenger in a vehicle and be secured to the same seat belt restraint system as the passenger.

BRIEF DESCRIPTION OF THE DRAWINGS

A better understanding will be had with respect to the present invention with reference to the drawings, wherein:

FIG. 1 is a perspective illustrational view showing the invention utilized to secure a conventional leash to the seat belt restraint system of an automotive vehicle;

FIG. 2 is a perspective view of the restraint keeper of the present invention in combination with a conventional leash which is secured thereto so as to be adjustable relative to the keeper;

FIG. 3 is a bottom plan view of the keeper shown in FIGS. 1 and 2;

FIG. 4 is a side elevational view of the keeper shown in FIG. 3;

DESCRIPTION OF THE PREFERRED EMBODIMENT

Figure 5:
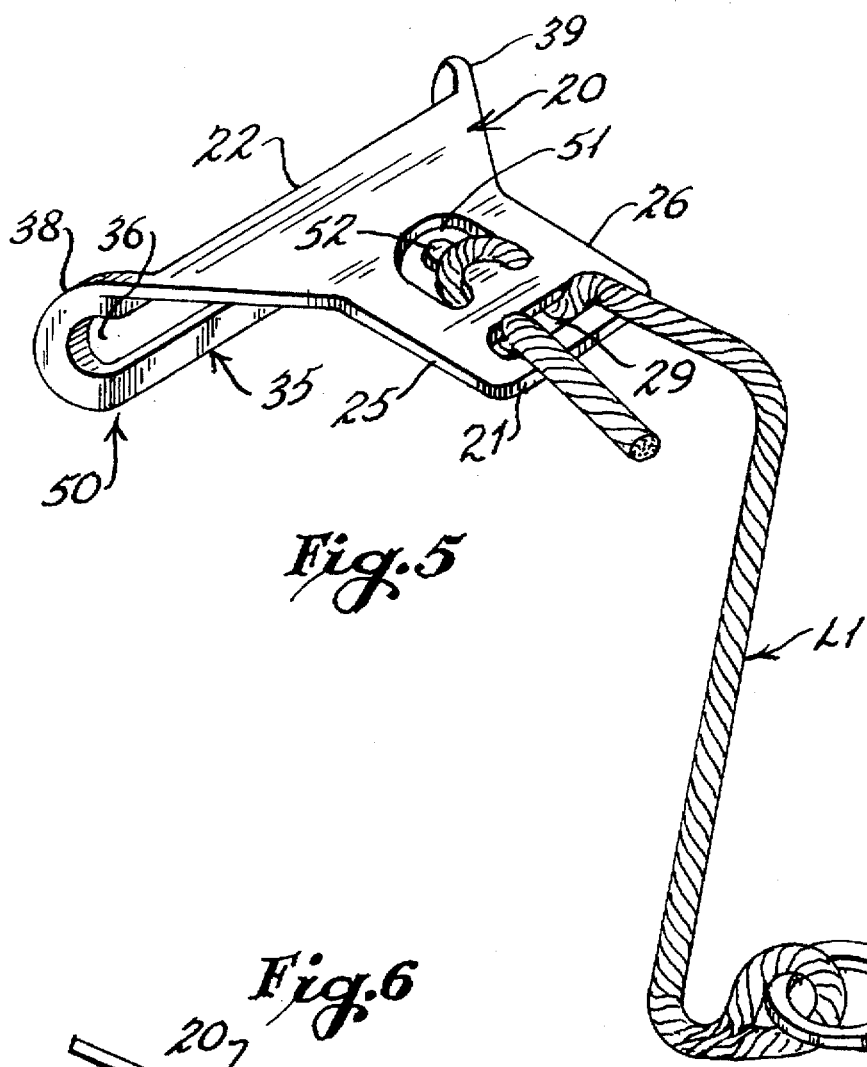
FIG. 5 is a top plan view of a second embodiment of keeper constructed in accordance with the teachings of the present invention.

With continued reference to the drawing figures, the restraint device or keeper 10 of the present invention is specially designed so as to enable conventional animal leashes or leads "L" to be selectively connected to conventional seat belt systems "S", such as found in automotive vehicles. Such seat belt systems include a metallic insert tab or fitting 12 which is secured to a seat belt 13. The tab is formed so as to be inserted and retained within a buckle receiver 14 which is secured to a strap 15 which is attached to an anchoring structure (not shown). The buckle includes a receiving slot into which the end of the tab is inserted so that a latch (not shown) is engageable through an opening 16 in the tab to thereby lock the seat belt to the anchoring structure. The size of the seat belt system tabs and buckles may vary depending upon the manufacturer or model of each system. Therefore, it is important to ensure that the restraint device or keeper 10 of the present invention may be adapted to substantially any conventional or commercially available seat belt system.

The restraint keeper includes a body 20 having first and second ends 21 and 22 and upper and lower surfaces or faces 23 and 24. In the preferred embodiment shown, the body is generally flat or planar and includes opposite side edges 25 and 26. A pair of enclosed openings 28 and 29 are formed through the body adjacent to and spaced from the first end 21. The openings 28 and 29 are preferably spaced from the side edges 25 and 26 so as to be completely encircled by the body. The openings are of a size so as to permit the leash or lead "L" to be inserted therethrough and thereafter wrapped, tied or clipped so as to be secured to the body.

Although two spaced openings 28 and 29 are shown with the preferred embodiment, in some instances only a single opening may be provided through which a leash or lead is secured. However, with two spaced openings, it is possible to mount the keeper to the leash so as to be adjustable along the length thereof by looping the leash, as shown in FIG. 2, in a first direction up through opening 28, then in an opposite direction down through the adjacent opening 29 and thereafter again extending the leash down through the first opening 28. As opposed to looping a conventional leash or lead through the openings 28 and 29, the leash may be otherwise permanently secured to the keeper such as by extending the leash through either a single or multiple openings and thereafter securing the leash, such as by stitching, adjacent the keeper.

With reference to FIGS. 3 and 4, a flange 35 extends transversely from the second end 22 of the body 20. Although the flange is preferably oriented substantially perpendicularly with respect to the body, it is possible that the flange could extend in the same plane as the body or at some other angle with respect thereto.

A closed slotted opening 36, that is an opening spaced from the edges of the flange, is provided generally centrally of the flange. Slot 36 is of a size to permit substantially any type of conventionally used seat belt tab 12 to be inserted therethrough and is small enough to prevent any conventional buckle receiver 15 from passing therethrough.

Figure 6:
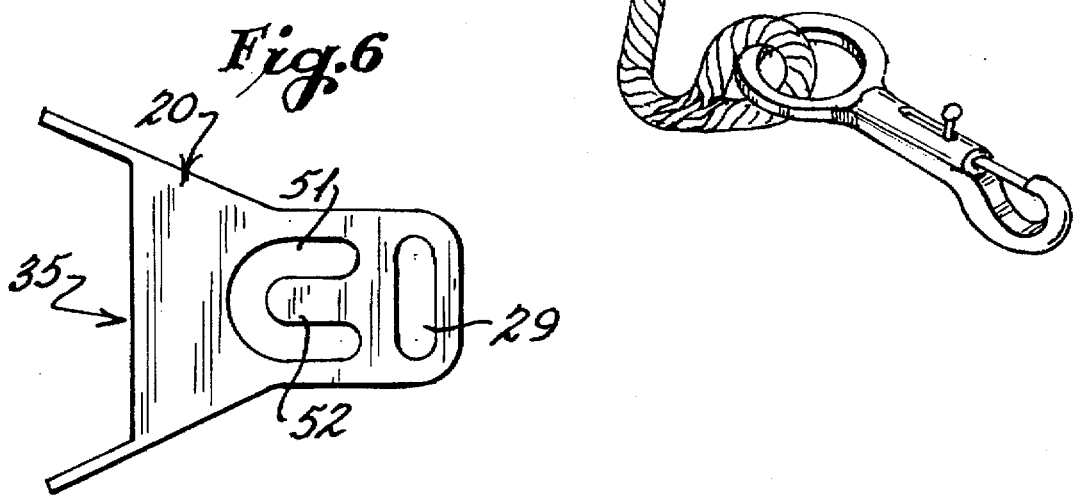
FIG. 6 is a top plan view of the embodiment of FIG. 5.

As shown in FIG. 2, the flange includes a central portion 37 and opposite end portions 38 and 39. As shown in FIGS. 2 and 3, the end portions 38 and 39 may be angled outwardly of the body from the second end 22 to thereby form abutments and guides for assisting in the assembly of the restraint keeper between an insert tab and a buckle receiver and which thereafter prohibit the shifting movement of the keeper relative to the seat belt restraint system. In the preferred embodiment, the slot may extend through both the central and end portions. In FIGS. 5 and 6, the flange 35 is relatively straight.

Also, as shown in FIG. 3, the body may include first and second segments 41 and 42 which are integrally formed or stamped from metallic material. Segment 41 includes side walls 25 and 26 which are spaced at a first distance relative to one another whereas segment 42 includes side wall segments 25' and 26' which taper outwardly to the flange 35.

In use, after a leash, lead, rope or line has been secured to the keeper 10, the keeper is placed between the conventional insert tab 12 and the buckle receiver 14 of a seat belt restraint system. Thereafter, the tab is inserted into the buckle receiver through the opening 36 in the flange 35. As shown in FIG. 1, the tab includes outwardly extending shoulders 46 on opposite sides thereof. These shoulders will abut the end portions of the flange and prevent the keeper 10 from sliding over the insert tab and onto the belt portion of the restraint system. Thus, the keeper is positively retained between the tab and the buckle receiver when the keeper is in use. Also, as the keeper is designed not to slide beyond the tab of the seat belt restraint system, it is possible to secure both a passenger and a pet to the same seat belt receiver. This allows a pet to be carried by a passenger and yet be fully restrained by the seat belt restraint system.

Utilizing two openings 28 and 29 to receive a leash or lead through the body of the keeper 10, it is possible to adjust the effective length of the leash or lead relative to the seat belt restraint system so as to thereby control and limit the effective range of movement of an animal which is secured utilizing the invention to a conventional seat belt restraint system.

Figure 7:
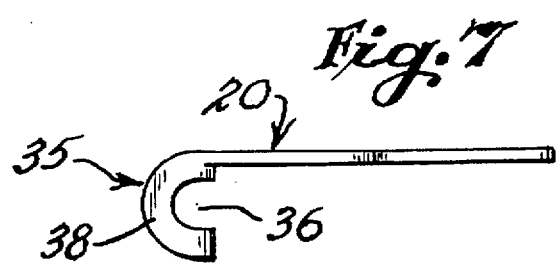
FIG. 7 is a side elevational view of the keeper shown in FIGS. 5 and 6.

With specific reference to FIGS. 5-7, another embodiment of the invention is disclosed. In this embodiment, the portions of the keeper 50 having the same features as the previous embodiment are numbered with the same numbers. The keeper 50, as opposed to having straight openings such as 28 and 29, includes one opening which is arcuately configured as shown at 51. A tongue member 52 is formed which extends intermediate the opposite ends of the opening. The tongue provides an anchor about which a leash, lead, rope or the like "L1" may be looped to thereby secure the leash or lead to the keeper.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A restraint device for connecting an animal leash or lead intermediate a seat belt buckle receiver and a latch tab in cooperation with a seat belt system, the device comprising, a keeper having a body portion with first and second ends and opposite side edge portions, at least one opening formed in said body adjacent said first end thereof, a flange extending from and generally transversely to said body portion, an enclosed slot in said flange of a size to cooperatively receive a latch tab therethrough whereby a conventional leash or lead may be extended through said at least one opening and secured to said keeper and said latch tab inserted through said enclosed slot and into a buckle receiver to thereby lock the leash or lead to a seat belt system.

2. The restraint device of claim 1 wherein said flange includes a central and opposite outer end portions, said outer end portions disposed at an angle relative to said central portion, and said enclosed slot extending across said central portion and into said outer end portions of said flange.

3. The restraint device of claim 2 including a pair of spaced openings formed in spaced relationship adjacent said first end of said body portion.

4. The restraint device of claim 3 wherein at least one of said openings is arcuate in configuration, thereby defining a tongue extending intermediate opposite sides of said at least one of said openings.

5. The restraint device of claim 4 wherein said flange extends generally perpendicularly with respect to said body.

6. The restraint device of claim 4 wherein said outer end portions of said flange extend from said second end of said body and away from said first end thereof.

7. The restraint device of claim 6 wherein said body includes first and second segments, said first segment extending from said first end toward said second end and being defined by side edges which are spaced at a first distance relative to one another, said second segment extending from said first segment to said second end, said second segment including side edges which flare outwardly relative to said side edges of said first segment to said body.

8. The restraint device of claim 6 wherein said flange extends from said second end of said body.

9. The restraint device of claim 1 wherein said body is generally flat, said flange including outer end portions which extend outwardly relative to said side edges of said body.

10. The restraint device of claim 1 wherein said at least one opening in said body is spaced from said opposite side edges and said first and second ends.

11. The restraint device of claim 10 including a pair of spaced openings.

12. A restraint device for connecting an animal leash or lead intermediate a seat belt buckle receiver and a latch tab in cooperation with a seat belt system, the device comprising, a keeper having a body portion with first and second ends and opposite side edge portions, at least one opening formed in said body adjacent said first end thereof, a member extending from said body portion, an enclosed slot in said flange of a size to cooperatively receive a latch tab therethrough whereby a conventional leash or lead may be extended through said at least one opening and secured to said keeper and said latch tab inserted through said enclosed slot and into a buckle receiver to thereby lock the leash or lead to a seat belt system.

13. The restraint device of claim 12 wherein said member is a flange extending at an angle with said body portion and from said second end thereof, said enclosed slot including a central and opposite outer end portions, said outer end portions disposed at an angle relative to said central portion, and said enclosed slot extending across said central portion and into said outer end portions of said flange.

14. The restraint device of claim 12 including a pair of spaced openings formed in spaced relationship adjacent said first end of said body portion.

15. The restraint device of claim 12 wherein at least one of said openings is arcuate in configuration, thereby defining a tongue extending intermediate opposite sides of said at least one of said openings.

16. A combination restraint device and animal leash or lead for allowing the leash or lead to be converted intermediate a seat belt buckle receiver and a latch tab in cooperation with a seat belt system, the combination comprising, a leash, a keeper having a body portion with first and second ends and opposite side edge portions, at least one opening formed in said body portion adjacent said first end thereof through which said leash is connected, a member extending from and generally transversely to said body portion, an enclosed slot in said member of a size to cooperatively receive a latch tab therethrough whereby a conventional leash or lead may be extended through said at least one opening and secured to said keeper and said latch tab inserted through said enclosed slot and into a buckle receiver to thereby lock the leash or lead to a seat belt system.

17. The combination of claim 16 wherein said member is a flange extending at an angle with said body portion and from said second end thereof, said enclosed slot including a central and opposite outer end portions, said outer end portions disposed at an angle relative to said central portion, and said enclosed slot extending across said central portion and into said outer end portions of said flange.

18. The combination of claim 17 including a pair of spaced openings formed in spaced relationship adjacent said first end of said body portion through which said leash means is secured.

19. The combination of claim 18 wherein at least one of said openings is arcuate in configuration, thereby defining a tongue extending intermediate opposite sides of said at least one of said openings.

20. The combination of claim 16 wherein said flange extends generally perpendicularly with respect to said body.

* * * * *